Patented Mar. 3, 1953

2,630,449

UNITED STATES PATENT OFFICE 2,630,449

SULFATED HYDROXY ALKYL THIO SUCCINATES

Edward S. Blake, Lexington, Mass., assignor to Monsanto Chemical Company, St. Louis, Mo., a corporation of Delaware No Drawing. Application July 18, 1949, Serial No. 105,449

7 Claims. (Cl. 260—458)

This invention relates to new and useful compositions of matter. More particularly it relates to sulfated products of hydroxy alkyl thio succinates of the general formula

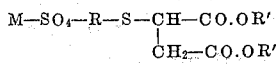

where M is an alkali metal such as sodium and potassium, or an ammonium or hydrocarbon substituted ammonium group; where R is an alkylene group; and where R' and R'' are selected from the group consisting of hydrogen and hydrocarbon groups. Typical examples of hydrocarbon groups comprise alkyl, aralkyl, and aryl groups such as methyl, ethyl, n-propyl, isopropyl, n-butyl, isobutyl, tert. butyl, amyl, hexyl, octyl, decyl, dodecyl, pentadecyl, octadecyl, allyl, oleyl, benzl, phenethyl, phenyl, tetrahydrofurfuryl, and the like. In the same molecule R' and R'' cannot both be hydrogen, and where R' and R'' are hydrocarbon groups they need not be like hydrocarbon groups.

The new products possess surface active properties and also possess good metallic ion stability in aqueous solutions. The new materials exhibit acid stability and thus may be employed to remove flux residues from soldered metal parts. They may be employed also in electroplating baths and in acid cleaning baths. They have other uses also.

The new materials are readily prepared by sulfating a hydroxy alkyl thio succinate under suitable conditions and neutralizing the resultant product, e. g., with alkali metal hydroxides. The hydroxy alkyl thio succinates are prepared by the addition of a hydroxyl substituted aliphatic mercaptan, such as mercapto ethanol, mercapto propanol, mercapto butanol, and the like, to maleic acid and its esters as described in co-pending application Serial No. 742,468 filed April 18, 1947, now United States Patent 2,477,327 granted July 26, 1949.

As exemplary of the preparation of the new materials the following is illustrative and in nowise is to be considered limitative thereof.

Example 1

The di-lorol ester of β-hydroxy ethyl thio succinic acid was prepared according to co-pending application Serial No. 742,468, filed April 18, 1947, by reacting substantially 48 parts by weight of di-lorol maleate, obtained by esterifying maleic acid with lorol which is a mixture of monohydric "cocoanut alcohols" consisting predominately of $C_{12}$ alcohols, with approximately 7.8 parts by weight of mercapto ethanol in a suitable container in the presence of approximately .3 parts by weight of the catalyst sodium methylate. Upon destroying the catalyst with dilute acid, the organic layer was taken up in a water immiscible solvent. The solution was washed until neutral, dried over anhydrous sodium sulfate, and filtered through a bed of Attapulgus clay. Upon removal of the solvent approximately 54 parts by weight of a light yellow oil believed to comprise the di-lorol ester of β-hydroxy ethyl thio succinic acid was obtained.

26.5 parts by weight of the above described hydroxy alkyl thio succinate was dissolved in 160 parts by weight of carbon tetrachloride and the solution cooled to —5° C. Thereto was added 6 parts by weight of chlorosulfonic acid over a period of 20 to 25 minutes, with agitation, while keeping the temperature below 0° C. Agitation was continued after completion of the acid addition for a short period and the solution was subsequently neutralized with a 10 percent aqueous soda ash solution. Upon distilling off the solvent approximately a theoretical yield of a wax-like product believed to comprise the sodium sulfate of the di-lorol ester of β-hydroxy ethyl thio succinic acid was obtained.

Example 2

Equal molecular quantities of mercapto ethanol and di-oleyl maleate were mixed in a suitable container in the presence of approximately half a mol of sodium methylate as a catalyst. The mixture was agitated for several hours and an exothermic reaction took place. Dilute acid was added to destroy the catalyst and the organic layer was taken up in a water immiscible solvent and thereafter the solution was washed neutral. The solution was then dried over anhydrous sodium sulfate and filtered through a bed of Attapulgus clay. Upon removal of the solvent substantially a theoretical yield of a light yellow oil believed to comprise the di-oleyl ester of β-hydroxy ethyl thio succinic acid was obtained.

34.7 parts by weight of the above prepared hydroxy alkyl thio succinate was dissolved in 160 parts by weight of carbon tetrachloride. While retaining the temperature at 30°–35° C., 6 parts by weight of chlorosulfonic acid was slowly added. Upon completion of the acid addition agitation was continued for a short time and thereafter the solution was neutralized with an aqueous solution of soda ash. Upon distilling off the solvent approximately a theoretical yield of a wax-like product believed to comprise the sodium sulfate of the di-oleyl ester of β-hydroxy ethyl succinic acid was obtained.

*Example 3*

Replacing di-oleyl maleate in Example 2 with di-octadecyl maleate, obtained by esterifying maleic acid with octadecyl alcohol, and reacting with mercapto ethanol in the manner described results in a product believed to comprise the di-octadecyl ester of β-hydroxy ethyl thio succinic acid. Upon sulfating according to the procedure of Example 2 and neutralizing with soda ash, a wax-like product believed to comprise the sodium sulfate of the di-octadecyl ester of β-hydroxy ethyl thio succinic acid is obtained.

By replacing soda ash in the above examples with such acid neutralizing materials as potassium carbonate, ammonium hydroxide, mono-, di-, and tri-amines, such as the methyl amines, the ethanol amines, the butyl amines, the amyl amines, the cyclohexyl amines, and the like, respectively, the corresponding potassium, ammonium, and hydrocarbon substituted ammonium sulfates of hydroxy alkyl thio succinates are obtained. A particularly economical and useful neutralizing agent is caustic soda.

A particularly useful group of the new chemicals are those where R' and R" in the above described general formula are branched or straight chain aliphatic groups containing from 10 to 18 carbon atoms and where M is an alkali metal such as sodium.

Other sulfating agents than chlorosulfonic acid may be employed to produce the new materials, as for example, oleum, and other temperatures may be employed than those specifically shown.

While the invention has been described with respect to several specific embodiments, it is to be understood that modifications and variations thereof may be resorted to without departing from the spirit or scope of the invention.

What is claimed is:

1. As a new composition of matter a compound of the formula

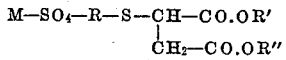

where M is selected from the group consisting of alkali metals, ammonium and hydrocarbon substituted ammonium groups, where R is an alkylene group containing more than one but less than five carbon atoms, and where R' and R" are selected from the group consisting of alkyl, phenalkyl and phenyl groups containing not more than 18 carbon atoms and hydrogen, but where R' and R" are not both hydrogen atoms.

2. As a new composition of matter a compound of the formula

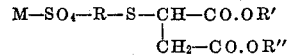

where M is an alkali metal, where R is an alkylene group containing more than one but less than five carbon atoms, and where R' and R" are alkyl groups containing not more than 18 carbon atoms.

3. As a new composition of matter a compound of the formula

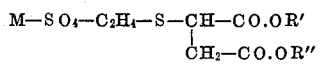

where M is an alkali metal and where R' and R" are alkyl groups containing not more than 18 carbon atoms.

4. As a new composition of matter a compound of the formula

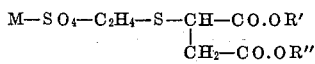

where M is an alkali metal and where R' and R" are alkyl groups containing from 10 to 18 carbon atoms.

5. As a new composition of matter a compound of the formula

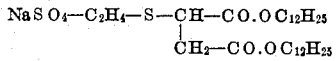

6. As a new composition of matter a compound of the formula

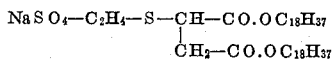

7. As a new composition of matter a compound of the formula

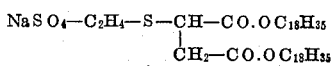

EDWARD S. BLAKE.

REFERENCES CITED

The following references are of record in the file of this patent:

UNITED STATES PATENTS

| Number | Name | Date |
|---|---|---|
| 2,225,673 | Werntz | Dec. 24, 1940 |
| 2,477,327 | Blake | July 26, 1949 |